United States Patent
Aharoni et al.

(10) Patent No.: US 12,340,111 B1
(45) Date of Patent: Jun. 24, 2025

(54) PROCESSING OF INPUT/OUTPUT OPERATIONS WITHIN A FAULT DOMAIN OF A DATA STORAGE SYSTEM

(71) Applicant: Dell Products L.P., Round Rock, TX (US)

(72) Inventors: Dan Aharoni, Brookline, MA (US); Roi Tagar, Haifa (IL); Aharon Blitzer, Shoham (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/392,838

(22) Filed: Dec. 21, 2023

(51) Int. Cl.
*G06F 12/00* (2006.01)
*G06F 3/06* (2006.01)

(52) U.S. Cl.
CPC .............. *G06F 3/065* (2013.01); *G06F 3/061* (2013.01); *G06F 3/0619* (2013.01); *G06F 3/067* (2013.01)

(58) Field of Classification Search
CPC ........ G06F 3/065; G06F 3/061; G06F 3/0619; G06F 3/067
USPC ......................................................... 711/154
See application file for complete search history.

(56) References Cited

U.S. PATENT DOCUMENTS

| | | | |
|---|---|---|---|
| 12,111,728 B2 * | 10/2024 | Pu .......................... | G06F 11/108 |
| 2022/0027080 A1 * | 1/2022 | Patel ...................... | G06F 3/0676 |
| 2022/0171685 A1 * | 6/2022 | Xiang .................. | G06F 11/2064 |

OTHER PUBLICATIONS

"Configure IOPS and Bandwidth"; https://www.dell.com/support/manuals/en-us/scaleio/powerflex_sw_admin_guide_4x/configure-iops-and-bandwidth?guid=guid-6fe9b467-d56e-4a55-a913-1271b6d20e16&lang=en-us; downloaded Dec. 18, 2023.
Gerasimov, A, "PowerFlex IO Errors During Rebalance"; https://www.dell.com/community/en/conversations/powerflex/io-errors-during-rebalance/647f6dc5f4ccf8a8deb181c3; downloaded Dec. 18, 2023.
U.S. Appl. No. 18/351,836, entitled, "Multi-Modal Write Cache for Data Storage System"; filed Jul. 13, 2023.
Nakano et al., "ReViveI/O: Efficient Handling of I/O in Highly-Available Roollback-Recovery Servers"; University of Illinois at Urbana-Champaign; downloaded Dec. 18, 2023.

* cited by examiner

*Primary Examiner* — Mardochee Chery
(74) *Attorney, Agent, or Firm* — Ryan, Mason & Lewis, LLP

(57) ABSTRACT

Techniques are provided for processing of input/output (I/O) operations within a fault domain of a data storage system. One method comprises receiving I/O write requests from a client application, executing in a first fault domain, to write data; writing, by the storage control system, a primary copy of the data of the I/O write requests to at least one storage volume in the first fault domain using a designated assignment of the client application to the first fault domain; and writing a secondary copy of the data of the I/O write requests to at least one storage volume in an additional fault domain, wherein data responsive to I/O read requests from the client application executing in the first fault domain is obtained from the at least one storage volume in the first fault domain.

20 Claims, 10 Drawing Sheets

PROCESSING OF INPUT/OUTPUT OPERATIONS WITHIN A FAULT DOMAIN OF A DATA STORAGE SYSTEM

BACKGROUND

The amount of data that must be stored and managed, for example, in datacenters and cloud-based storage systems, continues to increase. To meet such data storage demands, datacenters and cloud-based storage systems increasingly use a software-defined storage platform that provides significant flexibility, enhanced storage performance and scalability for the data storage environment. Data protection techniques may be employed to replicate data across different storage nodes of such datacenters and/or cloud-based storage systems to achieve resiliency. There is often a significant cost incurred when transferring data among different datacenters and/or cloud-based storage systems (or portions thereof).

SUMMARY

Illustrative embodiments of the disclosure provide techniques for processing of input/output (I/O) operations within a fault domain of a data storage system. An exemplary method comprises receiving, by a storage control system, one or more I/O write requests from a client application, executing in a first fault domain of a plurality of fault domains, to write data; writing, by the storage control system, a primary copy of the data of the one or more I/O write requests to at least one storage volume in the first fault domain using a designated assignment of the client application to the first fault domain; and writing, by the storage control system, a secondary copy of the data of the one or more I/O write requests to at least one storage volume in one or more additional fault domains of the plurality of fault domains, wherein data responsive to one or more I/O read requests from the client application executing in the first fault domain is obtained from the at least one storage volume in the first fault domain.

Illustrative embodiments can provide significant advantages relative to conventional techniques for processing I/O operations. For example, problems associated with transferring data among different datacenters and/or cloud-based storage systems are overcome in one or more embodiments by storing primary copies of data associated with a given client application in the same fault domain of a data storage system where the client application is executing.

Other illustrative embodiments include, without limitation, apparatus, systems, methods and computer program products comprising processor-readable storage media.

DETAILED DESCRIPTION

Figure 1:
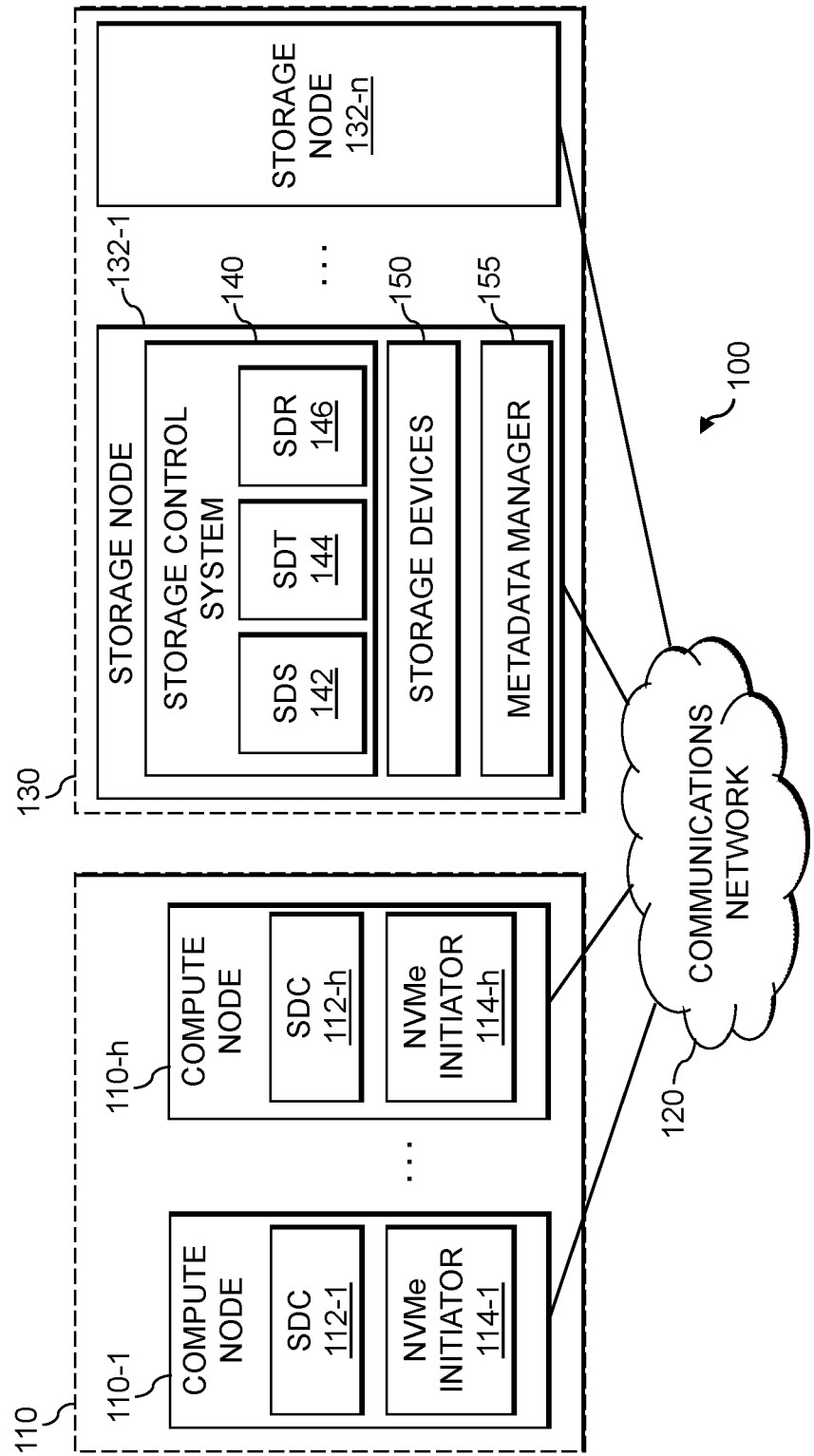
FIG. 1 illustrates a network computing environment that can be configured for processing of I/O operations within a fault domain of storage system in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for processing I/O operations within a fault domain of a data storage system.

In some embodiments, data protection techniques may be employed that replicate (e.g., mirror) data across different storage nodes or fault domains (e.g., availability zones) to achieve resiliency. Storage volumes may be automatically replicated within an availability zone, which provides resiliency to protect against failures. For example, one or more public cloud vendors may provide multiple physical locations for resources (e.g., storage volumes) referred to as "regions" and "availability zones" (AZ), etc. In the context of public cloud services, availability zones are similar to fault domains in that, generally speaking, availability zones provide isolation boundaries for computing and storage resources, wherein if one availability zone becomes unavailable (for example, due to a failure), the other availability zones continue working. In some embodiments, availability zones are utilized to provide data resiliency, wherein data may be stored in a storage volume that is located in one availability zone, while the data is replicated in a storage volume that is located in another availability zone.

In this regard, physically locating primary and secondary storage volumes in different availability zones provides some level of resilience to failures (and allows for continuity of operation) with the assumption that it is highly unlikely to have a concurrent failure of both availability zones potentially resulting in the loss of the primary and secondary data at the same time, as discussed further below.

Availability zones may comprise isolated data centers located within specific regions in which public cloud services originate and operate. An availability zone may comprise, for example, one or more data centers, wherein each data center is equipped with independent power, cooling and networking infrastructure all housed in separate facilities. The availability zones within a given region are typically connected to each other through fast, private fiber-optic networks, and allow customers to run mission-critical applications with high availability and low-latency replication. A region is a geographical location having multiple availability zones mapped within it. Each region can have any number of availability zones, and each region is isolated and independent from every other region such that the availability zones are not shared between different regions. Regions are distributed over the world which allows cloud providers to service customers on multiple continents.

A cloud user (e.g., a business enterprise) can utilize nodes (e.g., compute and/or storage nodes) in different availability zones to achieve fault tolerance, wherein the cloud user workload can be distributed across two more different availability zones within a given region. A cloud user can replicate services across multiple availability zones to decrease latency and/or protect resources (e.g., resources can be moved to another availability zone in the event of an outage). The cloud user can distribute instances (e.g., applications, virtual machines, elastic compute cloud instances, etc. running on the compute nodes) across multiple availability zones to provide redundancy and failover in the event that a given data center in an availability zone encounters a problem.

Consider a region comprising three availability zones, where a given availability zone in the region executes a particular application, a primary copy of the data of the particular application is stored in the given availability zone and a secondary copy of the data of the particular application is stored in one or more of the two additional availability zones. If the given availability zone fails or otherwise becomes unavailable, another copy of the data is available on at least one other availability zone in the region. Data unavailability and/or a data loss resulting from an unavailable availability zone may have a significant impact on an enterprise organization, for example.

A storage system can mitigate the impact of such potential data unavailability by defining a fault set for each availability zone. By grouping storage nodes into a given fault set, a storage system can be configured to mirror the data for all storage devices in the given fault set, where the mirroring is performed on storage nodes that are outside of the given fault set. The fault set ensures that an application may continue to have access to data stored in the given fault set even if one or more storage devices in the given fault set become unavailable.

One or more aspects of the disclosure recognize that there may be a significant financial cost associated with transferring data from one availability zone to another, in response to a given availability zone failing or otherwise becoming unavailable. For example, in a cloud-based implementation, a cloud provider may charge a designated price for each gigabyte of transferred data.

In a number of existing storage implementations, data is striped across available storage nodes and storage drives in a storage pool and a protection domain to balance the workload and efficiently utilize the available resources. Consider again the exemplary region comprising three availability zones, where a given availability zone in the region executes a particular application. One third of the data of the application may be stored in the given availability zone and the remaining data may be stored across the two additional availability zones. Thus, two-thirds of the read operations in such an example will be directed to the two remote availability zones, which can result in a significant financial cost for the customer. A write operation will have at least one remote network operation to at least one other availability zone, which may again result in a significant financial cost for the customer.

Techniques are provided in some embodiments for processing of input/output operations within a fault domain of a data storage system. Such techniques are sometimes referred to herein as "unbalanced I/O processing" techniques (or an unbalanced I/O processing mode) that store primary copies of data associated with a given client application in the same fault domain of a data storage system where the client application is executing.

FIG. 1 schematically illustrates a computing environment 100 that can be configured for processing I/O operations within a fault domain of a data storage system, according to an exemplary embodiment of the disclosure. In particular, FIG. 1 schematically illustrates one or more compute nodes 110-1 . . . 110-$h$ (collectively, compute nodes 110), a communications network 120 and a data storage system 130 comprising a plurality of storage nodes 132-1 . . . 132-$n$ (collectively, storage nodes 132).

In some embodiments, each compute node 110-1 . . . 110-$h$ comprises a storage data client (SDC) 112 and a non-volatile memory express (NVMe) initiator 114 (or NVMe initiator 114), the functions of which will be explained below.

As further shown in FIG. 1, the storage node 132-1 comprises a storage control system 140, storage devices 150 and a metadata manager (MDM) 155. In some embodiments, the storage control system 140 is a software-defined storage control system that comprises a storage data server (SDS) 142, a storage data target (SDT) 144 and a storage data replicator (SDR) 146, the functions of which will be explained below. In some embodiments, the other storage nodes (e.g., storage node 132-$n$) have the same or similar configuration as the storage node 132-1 shown in FIG. 1.

The compute nodes 110 may comprise physical server nodes and/or virtual server nodes that host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the compute nodes 110 comprise application servers, database servers, etc. The compute nodes 110 can include virtual nodes such as virtual machines and container systems. In some embodiments, the compute nodes 110 comprise a cluster of computing nodes of an enterprise computing system, a cloud-based computing system, or other types of computing systems or information processing systems comprising multiple computing nodes associated with respective users. The compute nodes 110 issue data access requests to the data storage system 130, wherein the data access requests include (i) write requests to store data in one or more of the storage nodes 132 and (ii) read requests to access data that is stored in one or more of the storage nodes 132.

The communications network 120 is configured to enable communication between the compute nodes 110 and the storage nodes 132, as well as peer-to-peer communications between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, that enable communication using, e.g., Transfer Control Protocol/Internet Protocol (TCP/IP) or other communication protocols such as Fibre Channel (FC), FC over Ethernet (FCOE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors that execute a lightweight operating system (e.g., a customized lightweight Linux kernel) and functional software (e.g., software-defined storage software) to implement functions of the storage control system 140, as discussed in further detail below.

The storage devices 150 of a given storage node 132 can be internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of persistent storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The data storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out storage system that allows additional storage nodes to be added (or removed) to the cluster to scale the performance and storage capacity of the data storage system 130. It is to be noted that each storage node 132 and associated storage devices 150 is an example of what is more generally referred to herein as a "storage system" or a "storage array."

In some embodiments, the data storage system 130 comprises a dynamic scale-out software-defined storage system that is configured to implement a high-capacity block-level SAN storage system (e.g., virtual SAN system) that consolidates the capacity of the storage devices 150 (e.g., HDDs, SSDs, NVMe flash storage, flash PCIe cards etc.) of the storage nodes 132 into shared block storage that is logically partitioned into logical storage volumes identified by, e.g., logical unit numbers (LUNs). In an exemplary embodiment of a scale-out software-defined SAN storage system, the storage control systems 140 comprise software components of a software-defined storage system, that are executed on the storage nodes 132 to implement a software-defined storage environment in which the storage nodes 132 form a loosely coupled storage server cluster and collectively communicate and operate to create a server-based SAN system (e.g., virtual SAN) to provide host access to a virtual pool of block storage using the combined storage capacity (e.g., storage devices 150) of the storage nodes 132.

In some embodiments, the SDCs 112, the MDMs 155, the SDSs 142, the SDTs 144, and the SDRs 146 of the storage nodes 132 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture that can grow from a few servers to thousands of severs.

For example, the SDS 142 comprises a service that is configured to manage the storage capacity (e.g., storage devices 150) of a single server (e.g., storage node 132) and provide back-end access to the storage devices of the server. In other words, the SDS 142 is installed on each server that contributes some or all of the capacity of its local storage devices to the scale-out data storage system. More specifically, in the scale-out software-defined storage environment, the SDSs 142 of the storage control systems 140 are configured to create and manage storage pools (e.g., virtual pools of block storage) by aggregating storage capacity of the respective storage devices 150 and dividing each storage pool into one or more volumes, wherein the volumes are exposed to the SDCs 112 of the compute nodes 110 as virtual block devices. For example, a virtual block device can correspond to a volume of a storage pool. Each virtual block device comprises any number of actual physical storage devices, wherein each virtual block device is preferably homogenous in terms of the type of storage devices that make up the block device (e.g., a block device can include only HDD devices or SSD devices, etc.). In this regard, each instance of the SDS 142 that runs on a respective one of the storage nodes 132 contributes some or all of its local storage space to an aggregated virtual pool of block storage with varying performance tiers (e.g., HDD, SSD, etc.) within a virtual SAN.

In some embodiments, each SDC 112 that executes on a given compute node 110 comprises a lightweight block device driver that is deployed to expose shared block volumes to the compute nodes 110. In particular, each SDC 112 is configured to expose the storage volumes as block devices to the applications located on the same server (e.g., application server) on which the SDC 112 is installed. In other words, as shown in FIG. 1, the SDCs 112 run on the same server machines as the compute nodes 110 that require access to the block devices exposed and managed by the SDSs 142 of the storage nodes 132. The SDC 112 of a given compute node 110 exposes block devices representing the virtual storage volumes that are currently mapped to the given compute node 110. In particular, the SDC 112 for a given compute node 110 serves as a block driver for the compute node 110, wherein the SDC 112 intercepts I/O requests, and utilizes the intercepted I/O request to access the block storage that is managed by the SDSs 142. The SDCs 112 are installed in the operating system or hypervisor hosting the application layer and provide the operating system or hypervisor (that runs the SDC 112) access to the logical block devices (e.g., volumes). The SDCs 112 have a knowledge of which SDSs 142 hold its block data, so multipathing can be accomplished natively through the SDCs 112, where the communications network 120 is configured to provide an any-to-any connection between the compute nodes 110 and the storage nodes 132. More specifically, each SDC 112 connects to every SDS 142, which eliminates the need for multipath software, in at least some embodiments.

In some embodiments, the MDMs 155 implement a management layer on one or more of the storage nodes 132 that manages and configures the software-defined storage system in the computing environment 100. The MDMs 155 are a service that function as a monitoring and configuration agent of the storage environment. More specifically, in some embodiments, the management layer is configured to supervise the operations of the storage cluster and manage storage cluster configurations. For example, the MDMs 155 (or an MDM cluster) manage the storage system by aggregating the entire storage exposed to the MDM cluster by the SDSs 142 to generate a virtual storage layer (e.g., virtual SAN storage layer), wherein logical volumes can be defined over storage pools and exposed to host applications as a local storage device using the SDCs 112.

Further, the MDMs 155 are configured to manage various types of metadata associated with the software-defined storage system. For example, such metadata includes a mapping of the SDCs 112 to the SDSs 142 of the storage nodes 132, wherein such mapping information is provided to the SDCs 112 and the SDSs 142 to allow such components to control I/O data path operations (e.g., allow the SDCs 112 to communicate with target SDSs 142 to access data in logical volumes that are mapped to the SDCs 112). In addition, the MDMs 155 collect connectivity status updates from the SDCs 112 to monitor all connections between SDCs 112 and the SDSs 142 to determine the current system state, and post events whenever a given SDC 112 connects to or disconnects from a specific IP address of a given SDS 142.

In addition, the MDMs 155 may be configured to manage various management operations such as data migration, rebuilds, and other system-related functions. In this regard, the MDMs 155 generate and manage various types of metadata that are required to perform various management operations in the storage environment such as, e.g., performing data migration operations, performing rebalancing operations, managing configuration changes, managing the SDCs 112 and the SDSs 142, maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. The MDMs 155 communicate with the SDCs 112 to provide notification of changes in data layout, and communicate with the SDSs 142 to coordinate rebalancing operations. In some embodiments, the MDMs 155 are configured to implement a distributed cluster management system.

In some embodiments, the software-defined storage system utilizes various logical entities that link the physical layer to the virtual storage layer, wherein such logical entities include protection domains, fault sets, and storage pools. In some embodiments, a protection domain is a logical entity that comprises a group of SDSs 142 that provide backup for each other. Each SDS 142 belongs to only one protection domain such that each protection domain comprises a unique set of SDSs 142. In some embodiments, each protection domain can have up to a maximum number of SDS nodes (e.g., 128 SDS nodes). The use of protection domains enables optimal performance, reduction of mean time between failure (MTF) issues, and the ability to sustain multiple failures in different protection domains.

Further, in some embodiments, a fault set is a logical entity that defines a logical group of SDS nodes (within a protection domain) that are more inclined to fail together, e.g., a group of SDS nodes within a given protection domain that are all powered in a same rack. By grouping SDS nodes into a given fault set, the system is configured to mirror the data for all storage devices in the given fault set, wherein mirroring is performed on SDS nodes that are outside the given fault set. A fault unit can be either a fault set or an SDS node that is not associated with a fault set. In some embodiments, user data is maintained in a RAID-1 mesh mirrored layout, where each piece of data is stored on two different fault units. The copies are distributed over the storage devices according to an algorithm that ensures uniform load of each fault unit in terms of capacity and expected network load.

Moreover, in some embodiments, a storage pool is a logical entity that defines a set of physical storage devices in a protection domain, wherein each storage device belongs to only one storage pool. When a volume is configured over the virtualization storage layer, in some embodiments, the volume is distributed over all devices residing in the same storage pool. Each storage pool comprises a homogeneous set of storage devices (e.g., HDD storage pool, or SSD storage pool) to enable storage tiering. In some embodiments, each volume block has two copies located on two different fault units (e.g., two different SDS nodes), that allows the system to maintain data availability following a single-point failure.

The SDR 146 is a software component that is configured to implement a data replication system, e.g., journal-based asynchronous replication. In some embodiments, asynchronous replication is performed between two peer data storage systems, which are connected via a WAN. In general, in some embodiments, asynchronous replication involves writing data to a source (primary) volume in a first data storage system and acknowledging completion of an I/O write operation to a host application before the data is replicated to a target (replica) volume in a second (remote) data storage system (e.g., the source (primary) volume and the target (replica) volume do not share hardware elements in at least some embodiments). With asynchronous replication, the I/O write operations at a source storage node are logged in a replication journal by a source SDR 146 on the source storage node, and the replication journal is periodically transmitted at scheduled times to a target storage node, wherein a target SDR 146 on the target storage node processes the received replication journal to replicate data to a target (replica) volume. The data replication system can be utilized for various purposes including, but not limited to, recovering from a physical or logical disaster, migrating data, testing data at a remote site, or offloading a data backup operation.

More specifically, in the exemplary embodiment of FIG. 1, the SDR 146 is responsible for processing all I/O requests associated with replicated volumes. In the source system, for replicated volumes, the SDCs 112 communicate with the SDR 146. For non-replicated volumes, the SDCs 112 communicate directly with the SDSs 142. At a source storage node, application I/O requests associated with a replicated volume are sent in some embodiments by an SDC 112 to a source SDR 146. The source SDR 146 will write the required journal data to a replication journal volume, and then send a duplicate of the replication I/O write request and associated user data to the SDS 142 wherein the SDS 142 performs write operations to write the received I/O user data in a primary volume. The journal data is then transmitted to a target SDR 146 on a target storage node, which processes the received replication journal to replicate data to the target (replica) volume. In some embodiments, a minimum of two SDRs are deployed on the source and target storage nodes to maintain high availability. If one SDR fails, the management layer (e.g., one or more MDM nodes) directs the SDCs to send the I/O requests for replicated volumes to an available SDR 146.

The SDT 144 is a software component that is configured to provide support for, for example, NVMe-oF, in particular, NVMe over TCP (NVMe/TCP) that enables NVMe-OF across a standard Ethernet network. In some embodiments, the SDT 144 is configured in the storage layer to handle the I/O requests of the NVMe initiators 114 to provide support for the NVMe/TCP storage protocol for front end connectivity, and thus, allow the use of NVMe/TCP hosts in addition to the SDCs 112. In some embodiments, the SDT 144 is an NVMe target that is configured to translate control and I/O data path packets for the NVMe standard protocol, wherein each NVMe initiator 114 is serviced by multiple SDTs 144 depending on the supported number of paths in the NVMe multipathing driver. In essence, I/O requests are sent from a host NVMe initiator 114 (which is installed in the host operating system or hypervisor) to the SDT 144, and the SDT 144 communicates with a target SDS 142 to direct the I/O request to the target SDS 142.

In some embodiments, the compute nodes 110 and/or storage nodes 132 within the computing environment 100 are physically partitioned/grouped in "fault domains." In general, a fault domain comprises a set of hardware components that share a single point of failure. In some embodiments, a fault domain comprises a group of storage nodes 132 that share a common power source and network switch. In some embodiments, fault domains (e.g., availability zones) provide a physical separation of a given customer workload over different hardware systems in a given datacenter (e.g., physical separation of power, cooling, and network hardware that supports the physical servers located in server racks) to prevent an outage in one fault domain from affecting the hardware systems in another fault domain.

Figure 2A:
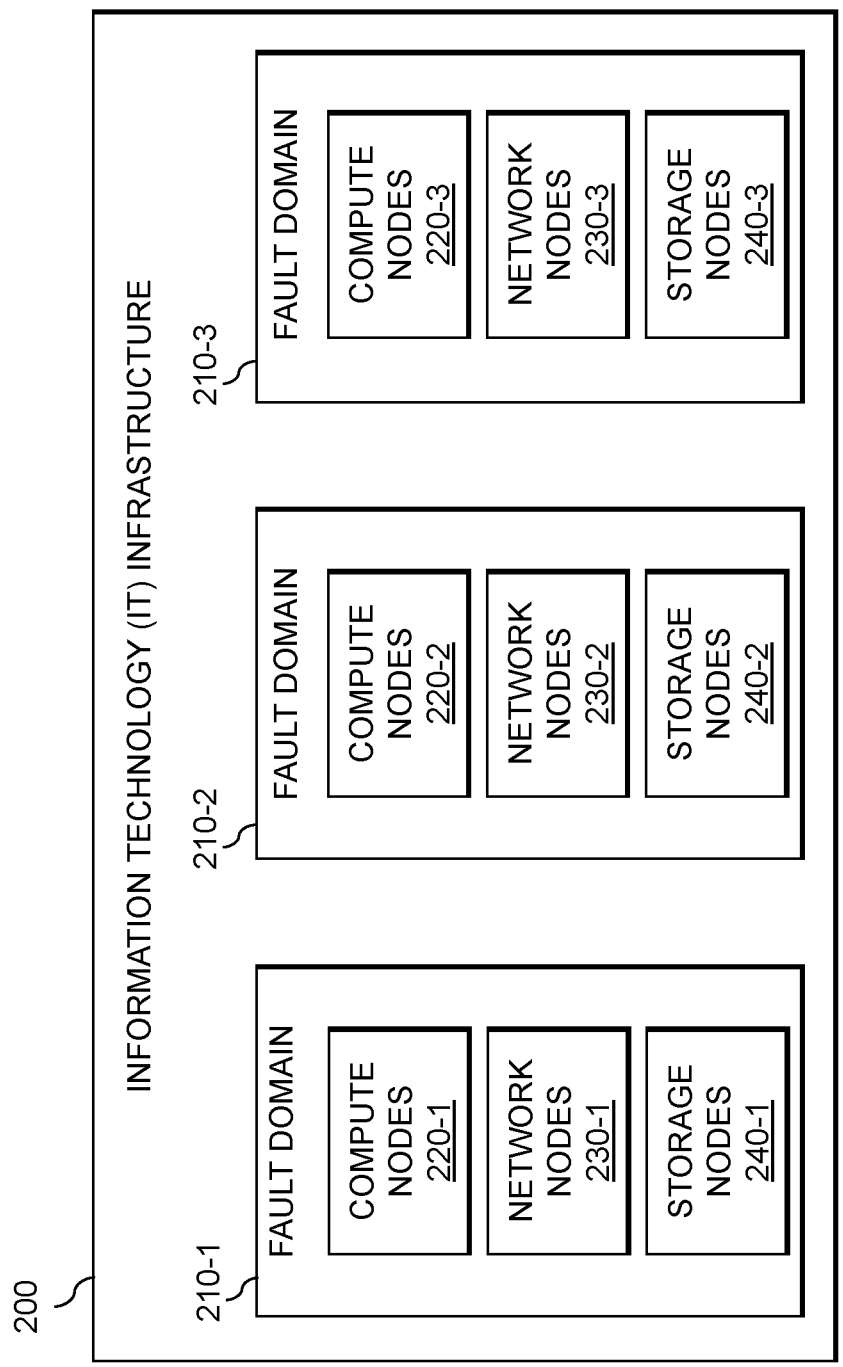
FIGS. 2A and 2B schematically illustrate computing environments that comprise a storage system that implements I/O processing in accordance with illustrative embodiments.

FIG. 2A schematically illustrates a computing environment that comprises a storage system that implements unbalanced I/O processing, according to another exemplary embodiment of the disclosure. In particular, FIG. 2A schematically illustrates a computing environment comprising an information technology (IT) infrastructure 200 comprising a plurality of IT assets (e.g., computing, network and storage assets) that are separated into a plurality of fault domains 210-1, 210-2 and 210-3. Each fault domain 210-1, 210-2 and 210-3 comprises respective compute nodes 220-1, 220-2 and 220-3, respective network nodes 230-1, 230-2 and 230-3, and respective storage nodes 240-1, 240-2 and 240-3 that implement a distributed storage system within and across the fault domains 210-1, 210-2 and 210-3. The storage nodes 240-1, 240-2 and 240-3 comprise respective storage devices (not shown in FIG. 2A) that are logically configured to include persistent storage volumes. The fault domains 210-1, 210-2 and 210-3 are connected via a network (not shown in FIG. 2A).

Figure 2B:
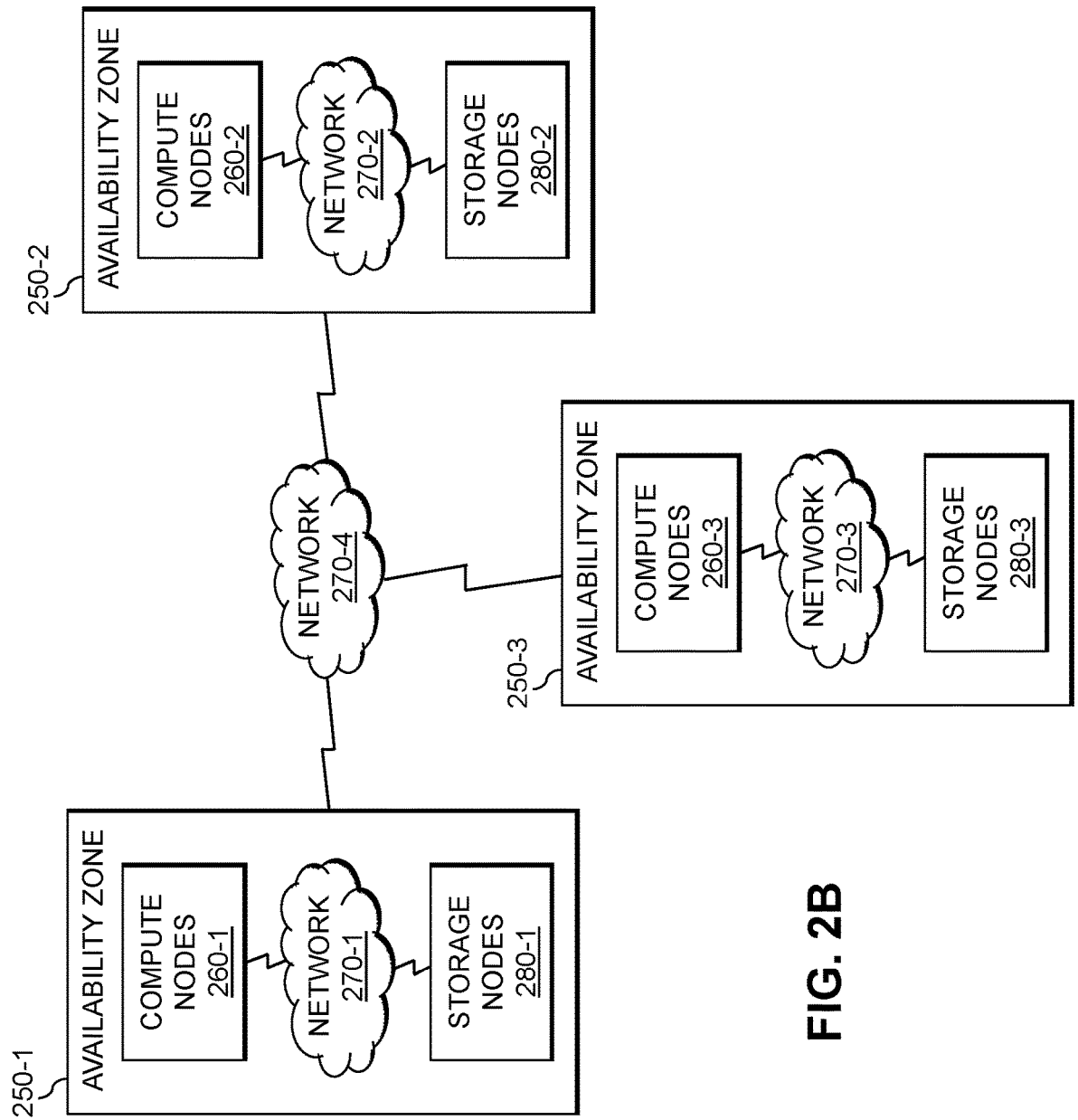

FIG. 2B schematically illustrates a computing environment that comprises a storage system that implements unbalanced I/O processing, according to another exemplary embodiment of the disclosure. In particular, FIG. 2B schematically illustrates a computing environment comprising computing and storage resources that are separated into a plurality of availability zones 250-1, 250-2 and 250-3 (e.g., within a given region of a public cloud vendor). The availability zones 250 of FIG. 2B are examples of the fault domains 210 of FIG. 2A.

Each availability zone 250-1, 250-2 and 250-3 comprises respective compute nodes 260-1, 260-2 and 260-3, respective networks 270-1, 270-2 and 270-3, and respective storage nodes 280-1, 280-2 and 280-3 that implement a distributed storage system within and across the availability zones 250-1, 250-2 and 250-3. The storage nodes 280-1, 280-2 and 280-3 comprise respective storage devices that are logically configured to include persistent storage volumes. The availability zones 250-1, 250-2 and 250-3 are connected via a network 270-4.

Currently, as noted above, public cloud vendors house computing and storage resources in highly available data center facilities that are located in different physical locations that are categorized by availability zones and regions to provide scalability and reliability. The availability zones 250 comprise isolated data centers located within specific regions in which public cloud services originate and operate. An availability zone may comprise, for example, one or more data centers, wherein each data center is equipped with independent power, cooling and networking infrastructure all housed in separate facilities. The availability zones 250 within a given region are typically connected to each other through fast, private fiber-optic networks (e.g., network 270-4), and allow customers to run mission-critical applications with high availability and low-latency replication. A region is a geographical location having multiple availability zones mapped within it. Each region can have any number of availability zones, and each region is isolated and independent from every other region such that the availability zones are not shared between different regions. Regions are distributed over the world which allows cloud providers to service customers on multiple continents. In the context of public cloud services, availability zones are similar to fault domains in that, generally speaking, availability zones provide isolation boundaries for computing and storage resources, wherein if one availability zone goes down, the others continue working.

FIGS. 1 and 2B show exemplary embodiments of a two-layer deployment in which the SDCs 112 (that consume storage) are deployed separately from the SDSs 142 (that contribute storage), e.g., the SDCs 112 are deployed on compute nodes 110, 220 that host end-user applications, while the SDSs 142 are deployed on storage nodes 132, 232 that contribute storage to the virtual SAN storage system.

In other embodiments, a converged infrastructure (e.g., hyperconverged infrastructure) can be implemented to provide a single-layer deployment in which, e.g., the SDCs 112 and the SDSs 142 are deployed on the same servers (e.g., each server node deploys a SDC 112 and an SDS 142) such that each server node is a data storage consumer (e.g., in a similar manner as compute nodes 110, 220) and a data storage supplier (e.g., in a similar manner as storage nodes 132, 232). In addition, for a single-layer deployment, the MDM 155 can be deployed on one or more server nodes that also host SDCs 112 and SDSs 142. In other embodiments, the computing environments of FIGS. 1 and 2 can be a hybrid system that is implemented with a combination of a single-layer and two-layer deployment.

Figure 3:
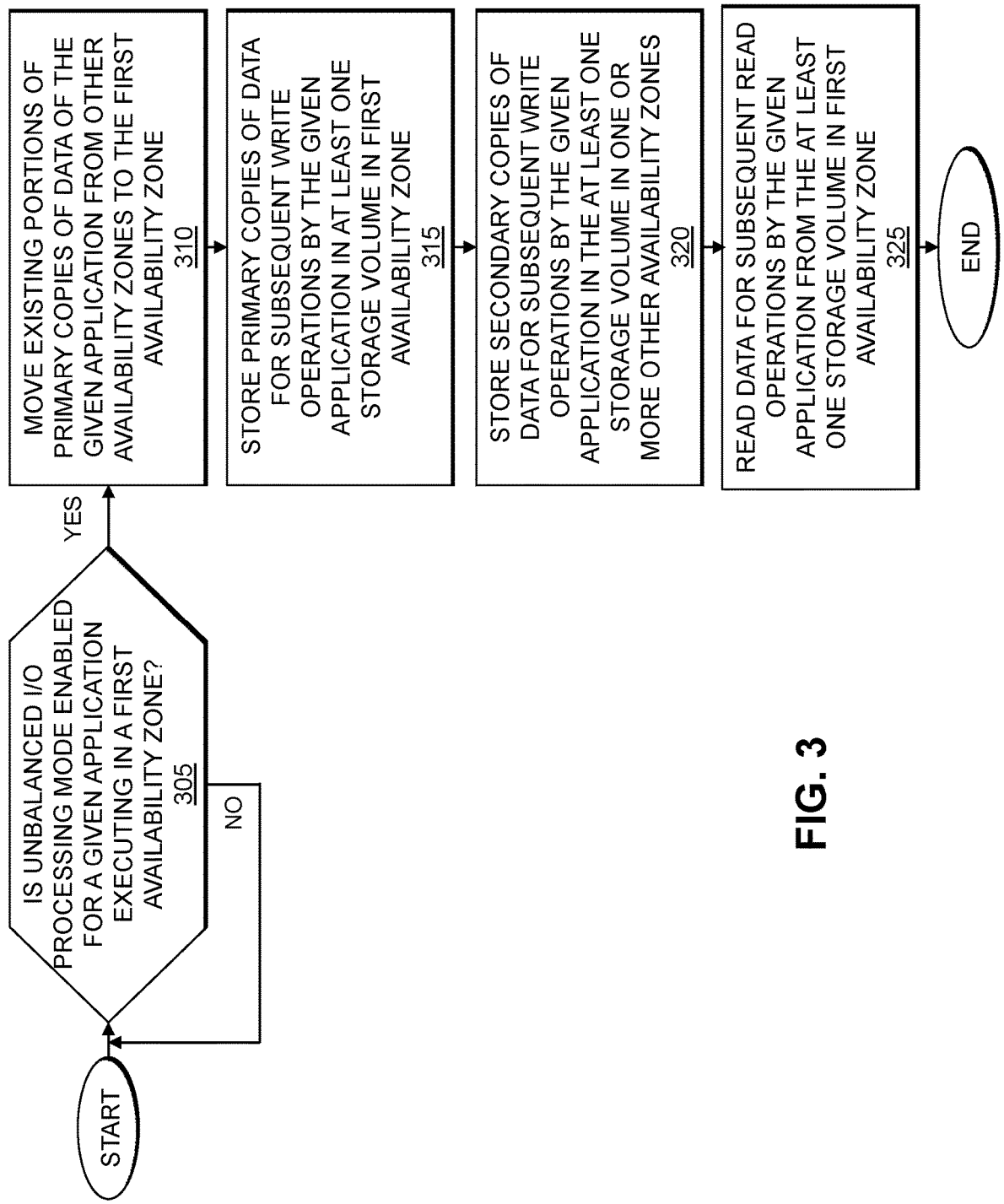
FIG. 3 is a flow diagram illustrating an exemplary implementation of a method for initiating an I/O processing mode for an application in accordance with an illustrative embodiment.

FIG. 3 is a flow diagram illustrating an exemplary implementation of a method for initiating an unbalanced I/O processing mode for an application in accordance with an illustrative embodiment. In the example of FIG. 3, a test is performed in step 305 to determine if an unbalanced I/O processing mode is enabled for a given application executing in a first availability zone. In at least some embodiments, primary copies of data of a given application are stored in a single availability zone when the given application is in an unbalanced I/O processing mode.

If it is determined in step 305 that the unbalanced I/O processing mode is enabled for the given application executing in the first availability zone, then program control proceeds to step 310. If, however, it is determined in step 305 that the unbalanced I/O processing mode is not enabled for the given application executing in the first availability zone, then program control returns to step 305 to continue monitoring for the unbalanced I/O processing mode to be enabled for the given application.

In step 310, existing portions of primary copies of data of the given application are moved from availability zones (e.g., in the same region) other than the first availability zone to the first availability zone. For example, in a region having three availability zones, the first availability zone will typically store approximately one-third of the data of the given application (e.g., with half of the data stored by the first availability zone comprising primary copies of the data and half of the data stored by the first availability zone comprising secondary copies of the data). The secondary copies of the data stored by the first availability zone are promoted to be secondary copies of the data. In addition, the two other availability zones typically store approximately two-thirds of the data of the given application and the two other availability zones transfer the primary copies of the data of the given application to the first availability zone (and maintain the secondary copies of the data of the given application), to ensure that the first availability zone stores a primary copy of all (e.g., substantially all) of the data of the given application. In some embodiments, if there is insufficient storage available in the first availability zone to store the transferred data from the other two availability zones, the unbalanced I/O processing mode will not be enabled and I/O write requests will be striped across the availability zones.

Primary copies of the data for subsequent write operations by the given application will be stored in step 315 in at least one storage volume of the first availability zone, as discussed further below in conjunction with FIG. 4. Secondary copies of the data for subsequent write operations by the given application will be stored in step 320 in the at least one storage volume of one or more of the other availability zones (e.g., in the same region).

Data for subsequent read operations by the given application is read from the at least one storage volume in the first availability zone in step 325, as discussed further below in conjunction with FIG. 5.

Figure 4:
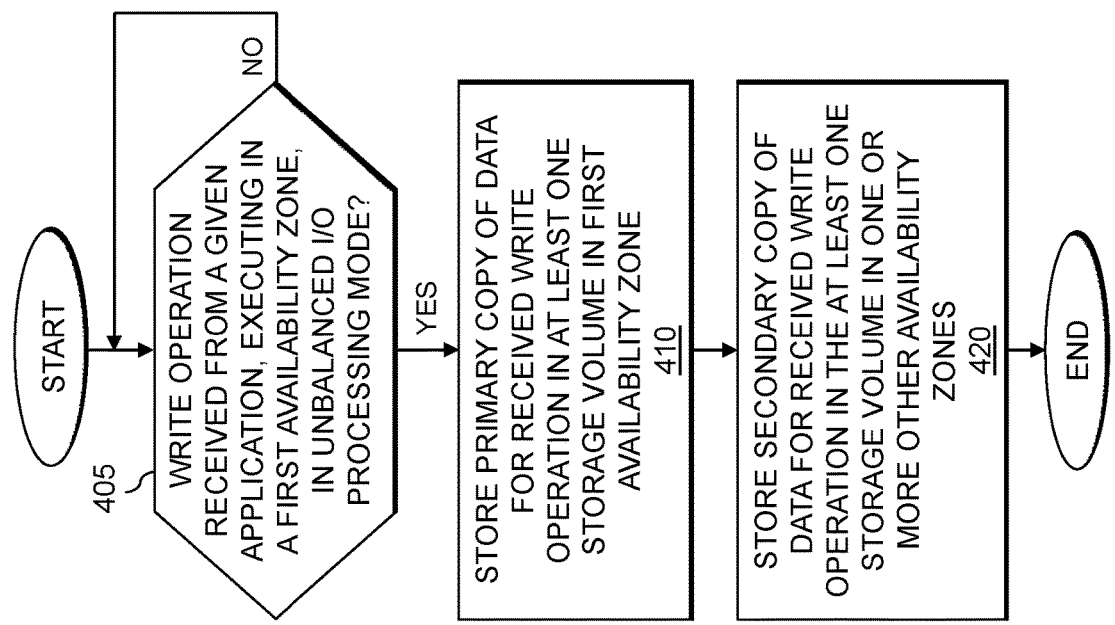
FIG. 4 is a flow diagram illustrating an exemplary implementation of a method for processing write operations of an application in accordance with an illustrative embodiment.

FIG. 4 is a flow diagram illustrating an exemplary implementation of a method for processing write operations of an application in accordance with an illustrative embodiment. In the example of FIG. 4, a test is performed in step 405 to determine if a write operation is received from a given application, executing in a first availability zone, in the unbalanced I/O processing mode. If it is determined in step 405 that a write operation is not received from the given application, executing in the first availability zone, in the unbalanced I/O processing mode, then program control returns to step 405 to continue monitoring for a new write operation to process.

If it is determined in step 405 that a write operation is received from the given application, executing in the first availability zone, in the unbalanced I/O processing mode, then a primary copy of the data for the received write operation is stored in step 410 in at least one storage volume of the first availability zone, and a secondary copy of the data for the received write operation is stored in step 420 in the at least one storage volume of one or more of the other availability zones (e.g., in the same region). In at least some embodiments, the given application will receive an acknowledgement that the write operation has been completed after the processing of step 420 is completed.

Figure 5:
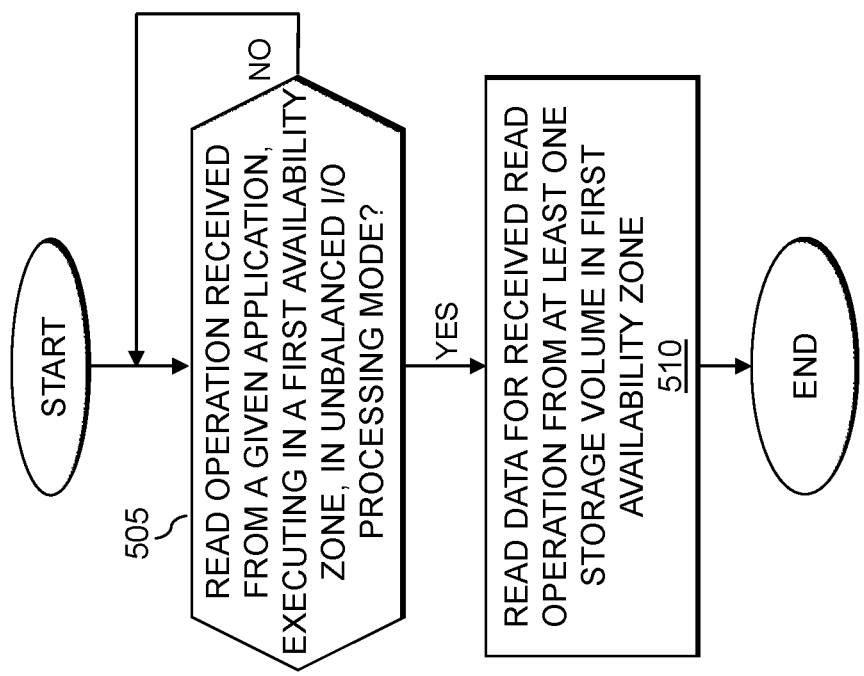
FIG. 5 is a flow diagram illustrating an exemplary implementation of a method for processing read operations of an application in accordance with an illustrative embodiment.

FIG. 5 is a flow diagram illustrating an exemplary implementation of a method for processing read operations of an application in accordance with an illustrative embodiment. In the example of FIG. 5, a test is performed in step 505 to determine if a read operation is received from a given application, executing in a first availability zone, in the unbalanced I/O processing mode. If it is determined in step 505 that a read operation is not received from the given application, executing in the first availability zone, in the unbalanced I/O processing mode, then program control returns to step 505 to continue monitoring for a new read operation to process.

If it is determined in step 505 that a read operation is received from the given application, executing in the first availability zone, in the unbalanced I/O processing mode, then the data for the received read operation is read in step 510 from at least one storage volume in the first availability zone.

Figure 6:
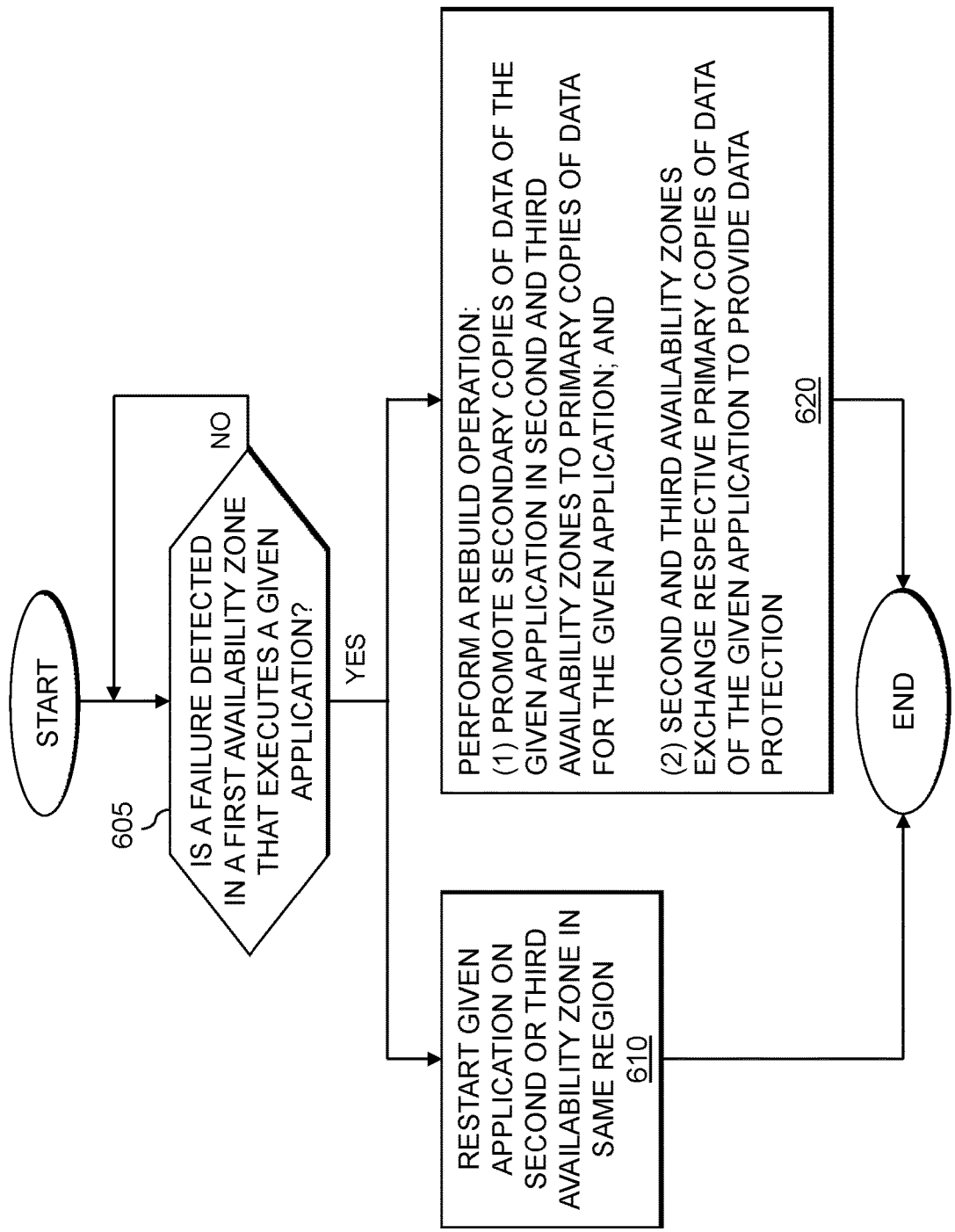
FIG. 6 is a flow diagram illustrating an exemplary implementation of a method for recovering from a failure in an availability zone in accordance with an illustrative embodiment.

FIG. 6 is a flow diagram illustrating an exemplary implementation of a method for recovering from a failure in an availability zone in accordance with an illustrative embodiment. In the example of FIG. 6, a region comprising three availability zones is assumed. The process of FIG. 6 can be extended to any number of availability zones, as would be apparent to a person of ordinary skill in the art.

A test is performed in step 605 to determine if a failure is detected in a first availability zone (e.g., one availability zone of three availability zones in a particular region) that executes a given application. If it is determined in step 605 that a failure is not detected in the first availability zone that executes the given application, then program control returns to step 605 to continue monitoring for an availability zone failure.

If it is determined in step 605 that a failure is detected in the first availability zone that executes the given application, then steps 610 and 620 are performed, for example, using parallel processing techniques. The given application is restarted in step 610 on the second or third availability zone (e.g., in the same region). In step 620, a rebuild operation is performed that (i) promotes secondary copies of the data of the given application in the second and third availability zones to primary copies of the data for the given application and (ii) the second and third availability zones exchange respective primary copies of the data of the given application in order to provide data protection.

In some embodiments, following the execution of the process of FIG. 6, the unbalanced I/O processing mode may be enabled for the given application so that all of the primary copies of the write data of the given application are stored in a given one of the second and third availability zones, in the manner described above in conjunction with FIG. 3.

Figure 7:
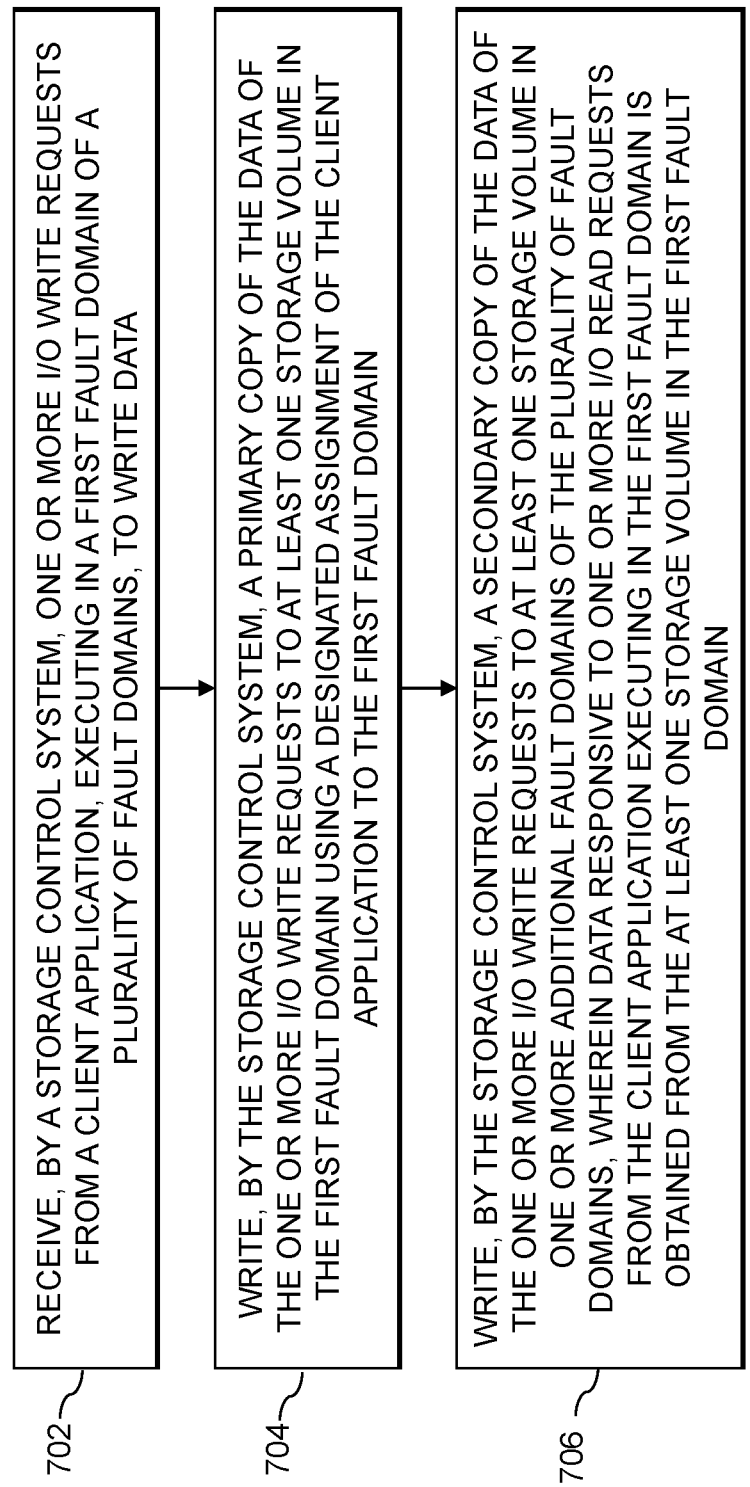
FIG. 7 is a flow diagram illustrating an exemplary implementation of a method for processing of I/O operations within a fault domain of a data storage system, according to one or more embodiments of the disclosure.

FIG. 7 is a flow diagram illustrating an exemplary implementation of a method for processing I/O operations within a fault domain of a data storage system, according to one or more embodiments of the disclosure. In the example of FIG. 7, a storage control system receives one or more I/O write requests in step 702 from a client application, executing in a first fault domain of a plurality of fault domains, to write data.

In step 704, the storage control system writes a primary copy of the data of the one or more I/O write requests to at least one storage volume in the first fault domain using a designated assignment (e.g., when the unbalanced I/O processing mode described herein is enabled for the client application, for example, prior to receiving the one or more I/O write requests of step 702) of the client application to the first fault domain (as opposed to, for example, a fault domain assignment based on a statistical or random assignment at the time of a given write operation). The designated assignment of the client application to the first fault domain may provide an indication to the storage control system to store the data (e.g., all data of the client application) associated with the I/O write requests of the client application in the at least one storage volume in the first fault domain.

The storage control system, in step 706, writes a secondary copy of the data of the one or more I/O write requests to the at least one storage volume in one or more additional fault domains of the plurality of fault domains, wherein data responsive to one or more I/O read requests from the client application executing in the first fault domain is obtained from the at least one storage volume in the first fault domain.

In one or more embodiments, in response to the client application receiving the designated assignment (e.g., a predefined assignment), the client application is controllably switched from a balanced I/O mode to an unbalanced I/O mode and at least portions of primary copies of data of the client application are transferred from the one or more additional fault domains to the first fault domain. The first fault domain may comprise a first availability zone of a public cloud computing system and the one or more additional fault domains may comprise one or more additional availability zones of the public cloud computing system.

In some embodiments, in response to a failure in the first fault domain, the client application is restarted in a given one of the one or more additional fault domains and a rebuild operation is performed to promote one or more secondary copies of the data of the client application in the one or more additional fault domains to primary copies of the data of the client application. The one or more additional fault domains may exchange respective primary copies of the data of the client application (e.g., for data protection).

A plurality of client applications may be balanced among the first fault domain and the one or more additional fault domains. In addition, an acknowledgement may be provided to the client application in response to a completion of the writing the secondary copy of the data of the one or more I/O write requests to the at least one storage volume in the one or more additional fault domains.

The particular processing operations and other network functionality described in conjunction with the flow diagrams of FIGS. 3 through 7 are presented by way of illustrative example only and should not be construed as limiting the scope of the disclosure in any way. Alternative embodiments can use other types of processing operations for processing I/O operations within a fault domain of a data storage system. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

While one or more embodiments have been described herein using a virtual machine implementation, the disclosed unbalanced I/O processing techniques can also be applied for solutions running on containerized platforms (such as Kubernetes). For further reliability, the self-healing system can run in redundant (e.g., multiple) copies. Prerequisites may be kept outside of the cluster nodes and the cluster nodes can remain stateless. A modular design of the self-healing system, with the prerequisites, cluster monitor, and virtual infrastructure monitor in separate modules may be helpful in some embodiments for adopting the same solution (e.g., code base) for different cloud platforms and storage platforms. The prerequisites and commands/command blocks for the cluster monitor and virtual infrastructure monitor can be editable in some embodiments to adapt for other cluster types.

In some embodiments, techniques are provided for processing I/O operations within a fault domain of a data storage system. In at least some embodiments, the disclosed unbalanced I/O processing techniques provide a holistic infrastructure management system that uses domain knowledge of the storage system (software stack).

Among other benefits, the disclosed unbalanced I/O processing techniques store primary copies of the data of a given application in a single availability zone (e.g., when the given application has been placed in an unbalanced I/O processing mode). In this manner, all primary copies of the data of the given application can be written locally to a single availability zone and the data of the given application can be read locally from the same availability zone (e.g., all stored data of the given application will be local to the given application). Thus, the financial cost and/or the time (e.g., latency) to transfer data among multiple availability zones is significantly reduced.

One or more embodiments of the disclosure provide improved methods, apparatus and computer program products for processing I/O operations within a fault domain of a data storage system. The foregoing applications and associated embodiments should be considered as illustrative only, and numerous other embodiments can be configured using the techniques disclosed herein, in a wide variety of different applications.

It should also be understood that the disclosed unbalanced I/O processing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for processing I/O operations within a fault domain of a data storage system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based unbalanced I/O processing engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based unbalanced I/O processing platform in illustrative embodiments. The cloud-based systems can include block storage such as Amazon EBS (Elastic Block Store), GCP Persistent Disk, and Microsoft Azure Managed Disks.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
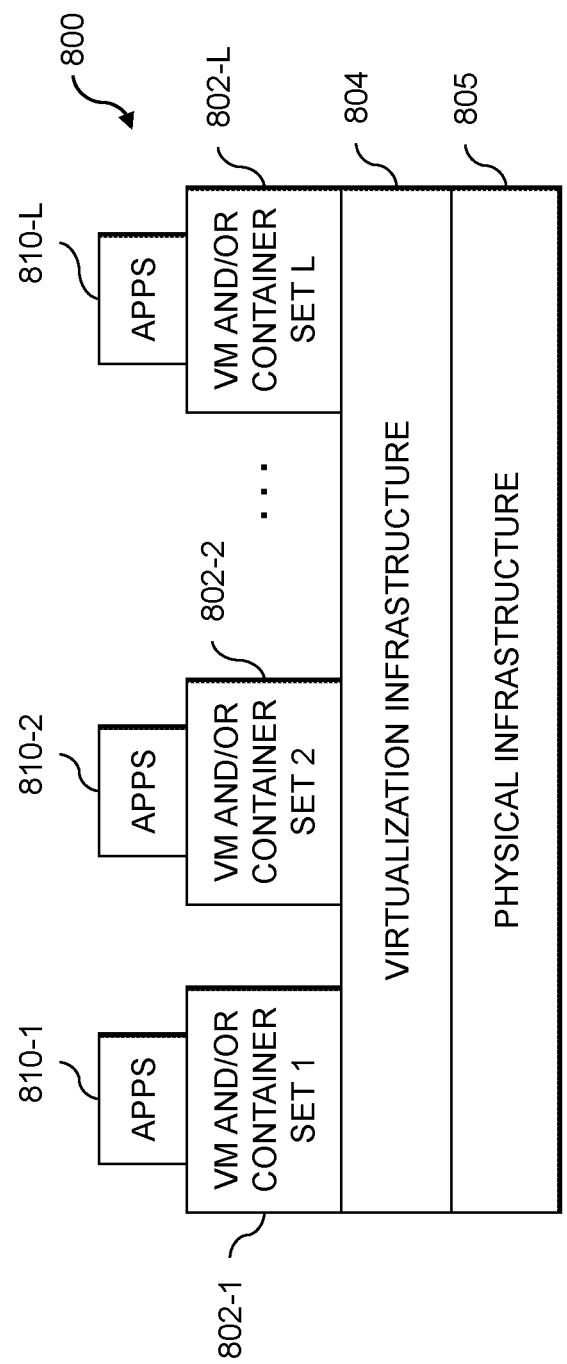
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of an information processing system. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide unbalanced I/O processing functionality of the type described above for one or more processes running on a given one of the VMs. For example, each of the VMs can implement unbalanced I/O processing control logic and associated functionality for recovering from failures in one or more availability zones for one or more processes running on that particular VM.

An example of a hypervisor platform that may be used to implement a hypervisor within the virtualization infrastructure 804 is a compute virtualization platform which may have an associated virtual infrastructure management system such as server management software. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide unbalanced I/O processing functionality of the type described above for one or more processes running on different ones of the containers. For example, a container host device supporting multiple containers of one or more container sets can implement one or more instances of unbalanced I/O processing control logic and associated functionality for recovering from failures in one or more availability zones.

As is apparent from the above, one or more of the processing modules or other components of the information processing system may each run on a computer, server, storage device or other processing platform element. A given such element may be viewed as an example of what is more generally referred to herein as a processing device. The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
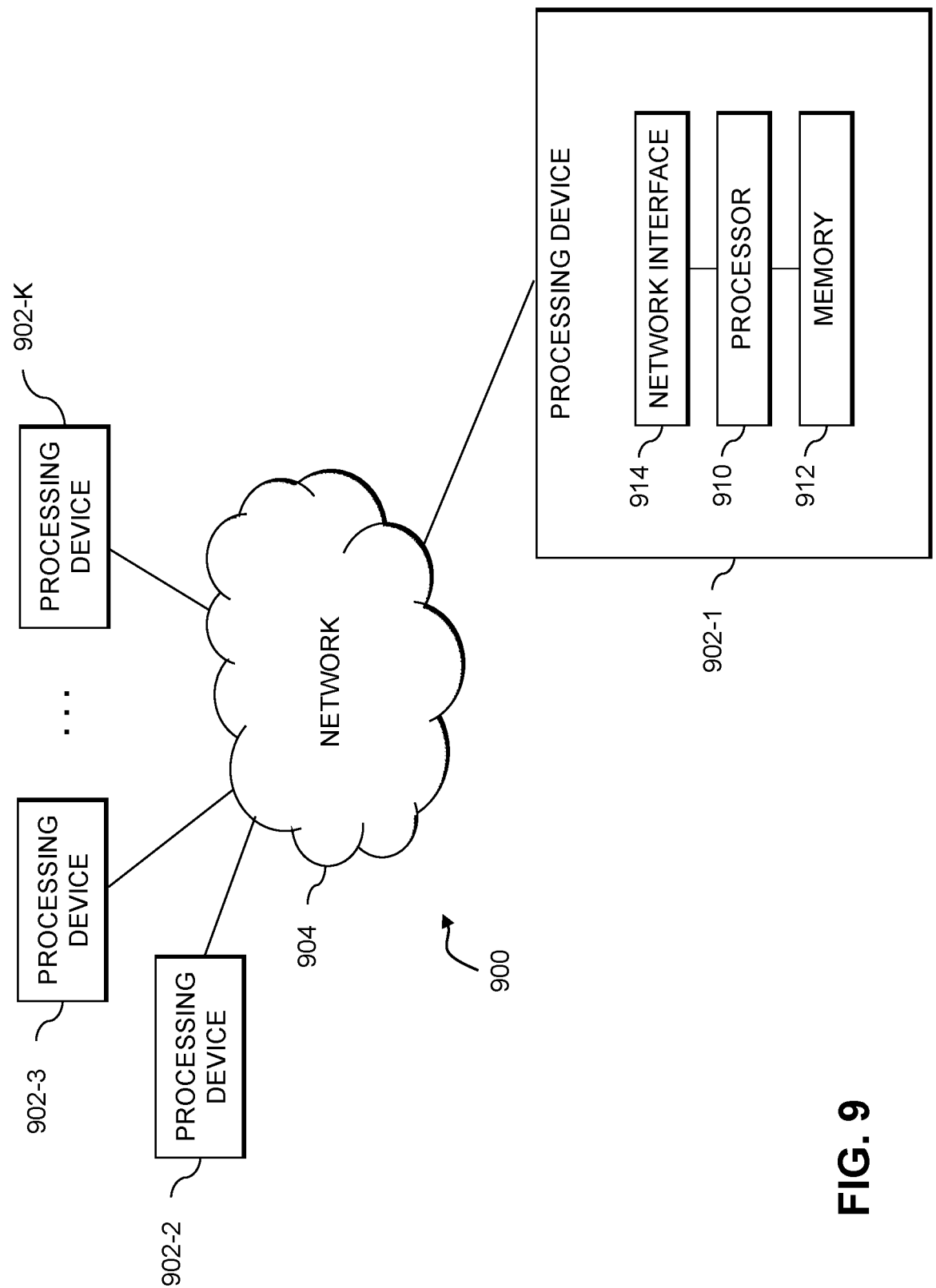
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving, by a storage control system, one or more input/output (I/O) write requests from a client application, executing in a first fault domain of a plurality of fault domains, to write data;
writing, by the storage control system, a primary copy of the data of the one or more I/O write requests to at least one storage volume in the first fault domain using a designated assignment of the client application to the first fault domain; and
writing, by the storage control system, a secondary copy of the data of the one or more I/O write requests to at least one storage volume in one or more additional fault domains of the plurality of fault domains, wherein data responsive to one or more I/O read requests from the client application executing in the first fault domain is obtained from the at least one storage volume in the first fault domain;
wherein the method is performed by at least one processing device comprising a processor coupled to a memory.

2. The method of claim 1, further comprising, in response to the client application receiving the designated assignment, controllably switching the client application from a balanced I/O mode to an unbalanced I/O mode and transferring at least portions of primary copies of data of the client application from the one or more additional fault domains to the first fault domain.

3. The method of claim 1, wherein the first fault domain comprises a first availability zone of a public cloud computing system and wherein the one or more additional fault domains comprise one or more additional availability zones of the public cloud computing system.

4. The method of claim 1, comprising, in response to a failure in the first fault domain, restarting the client application in a given one of the one or more additional fault domains and performing a rebuild operation to promote one or more secondary copies of the data of the client application in the one or more additional fault domains to primary copies of the data of the client application.

5. The method of claim 4, further comprising the one or more additional fault domains exchanging respective primary copies of the data of the client application.

6. The method of claim 1, further comprising balancing a plurality of client applications among the first fault domain and the one or more additional fault domains.

7. The method of claim 1, further comprising providing an acknowledgement to the client application in response to a completion of the writing the secondary copy of the data of the one or more I/O write requests to the at least one storage volume in the one or more additional fault domains.

8. The method of claim 1, wherein the designated assignment of the client application to the first fault domain provides an indication to the storage control system to store the data associated with the I/O write requests of the client application in the at least one storage volume in the first fault domain.

9. An apparatus comprising:
at least one processing device comprising a processor coupled to a memory;
the at least one processing device being configured to implement the following steps:
receiving, by a storage control system, one or more input/output (I/O) write requests from a client application, executing in a first fault domain of a plurality of fault domains, to write data;
writing, by the storage control system, a primary copy of the data of the one or more I/O write requests to at least one storage volume in the first fault domain using a designated assignment of the client application to the first fault domain; and
writing, by the storage control system, a secondary copy of the data of the one or more I/O write requests to at least one storage volume in one or more additional fault domains of the plurality of fault domains, wherein data responsive to one or more I/O read requests from the client application executing in the first fault domain is obtained from the at least one storage volume in the first fault domain.

10. The apparatus of claim 9, further comprising, in response to the client application receiving the designated assignment, controllably switching the client application from a balanced I/O mode to an unbalanced I/O mode and transferring at least portions of primary copies of data of the client application from the one or more additional fault domains to the first fault domain.

11. The apparatus of claim 9, wherein the first fault domain comprises a first availability zone of a public cloud computing system and wherein the one or more additional fault domains comprise one or more additional availability zones of the public cloud computing system.

12. The apparatus of claim 9, comprising, in response to a failure in the first fault domain, restarting the client application in a given one of the one or more additional fault domains, performing a rebuild operation to promote one or more secondary copies of the data of the client application in the one or more additional fault domains to primary copies of the data of the client application and the one or more additional fault domains exchanging respective primary copies of the data of the client application.

13. The apparatus of claim 9, further comprising balancing a plurality of client applications among the first fault domain and the one or more additional fault domains.

14. The apparatus of claim 9, further comprising providing an acknowledgement to the client application in response to a completion of the writing the secondary copy of the data of the one or more I/O write requests to the at least one storage volume in the one or more additional fault domains.

15. A non-transitory processor-readable storage medium having stored therein program code of one or more software programs, wherein the program code when executed by at least one processing device causes the at least one processing device to perform the following steps:
receiving, by a storage control system, one or more input/output (I/O) write requests from a client application, executing in a first fault domain of a plurality of fault domains, to write data;
writing, by the storage control system, a primary copy of the data of the one or more I/O write requests to at least one storage volume in the first fault domain using a designated assignment of the client application to the first fault domain; and
writing, by the storage control system, a secondary copy of the data of the one or more I/O write requests to at least one storage volume in one or more additional fault domains of the plurality of fault domains, wherein data responsive to one or more I/O read requests from the client application executing in the first fault domain is obtained from the at least one storage volume in the first fault domain.

16. The non-transitory processor-readable storage medium of claim 15, further comprising, in response to the client application receiving the designated assignment, controllably switching the client application from a balanced I/O mode to an unbalanced I/O mode and transferring at least portions of primary copies of data of the client application from the one or more additional fault domains to the first fault domain.

17. The non-transitory processor-readable storage medium of claim 15, wherein the first fault domain comprises a first availability zone of a public cloud computing system and wherein the one or more additional fault domains comprise one or more additional availability zones of the public cloud computing system.

18. The non-transitory processor-readable storage medium of claim 15, comprising, in response to a failure in the first fault domain, restarting the client application in a given one of the one or more additional fault domains, performing a rebuild operation to promote one or more secondary copies of the data of the client application in the one or more additional fault domains to primary copies of the data of the client application and the one or more additional fault domains exchanging respective primary copies of the data of the client application.

19. The non-transitory processor-readable storage medium of claim 15, further comprising balancing a plurality of client applications among the first fault domain and the one or more additional fault domains.

20. The non-transitory processor-readable storage medium of claim 15, further comprising providing an acknowledgement to the client application in response to a completion of the writing the secondary copy of the data of the one or more I/O write requests to the at least one storage volume in the one or more additional fault domains.

* * * * *